(12) United States Patent
Steiner et al.

(10) Patent No.: US 7,991,963 B2
(45) Date of Patent: Aug. 2, 2011

(54) IN-MEMORY, IN-PAGE DIRECTORY CACHE COHERENCY SCHEME

(75) Inventors: Ian M. Steiner, Hillsboro, OR (US); Zhong-Ning George Cai, Lake Oswego, OR (US); Saurabh Tiwari, Bangalore (IN); Kai Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 665 days.

(21) Appl. No.: 12/006,326

(22) Filed: Dec. 31, 2007

(65) Prior Publication Data
US 2009/0172295 A1 Jul. 2, 2009

(51) Int. Cl.
*G06F 12/00* (2006.01)
(52) U.S. Cl. ......... 711/133; 711/118; 711/141; 711/159
(58) Field of Classification Search .............. 711/141, 711/118, 133, 159
See application file for complete search history.

(56) References Cited

U.S. PATENT DOCUMENTS

| | | | | |
|---|---|---|---|---|
| 5,297,269 A | * | 3/1994 | Donaldson et al. | 711/145 |
| 5,737,757 A | * | 4/1998 | Hassoun et al. | 711/145 |
| 5,813,030 A | * | 9/1998 | Tubbs | 711/118 |
| 5,864,671 A | | 1/1999 | Hagersten et al. | |
| 6,023,746 A | * | 2/2000 | Arimilli et al. | 711/118 |
| 6,295,598 B1 | * | 9/2001 | Bertoni et al. | 712/28 |
| 6,389,514 B1 | | 5/2002 | Rokicki | |
| 6,502,174 B1 | * | 12/2002 | Beardsley et al. | 711/170 |
| 6,868,485 B1 | * | 3/2005 | Conway | 711/154 |
| 6,877,088 B2 | * | 4/2005 | Dice | 712/235 |
| 7,051,166 B2 | * | 5/2006 | Sharma | 711/150 |

FOREIGN PATENT DOCUMENTS
DE 69732938 T2 2/2006

OTHER PUBLICATIONS
Office Action Received for German Patent Application No. 102008062 044.0, mailed on Feb. 25, 2010, 4 Pages of Office Action and 4 Pages of English Translation.

* cited by examiner

*Primary Examiner* — Matthew Bradley
(74) *Attorney, Agent, or Firm* — Caven & Aghevli LLC (57) ABSTRACT

In an embodiment, the method provides receiving a memory access request for a demanded cache line from a processor of a plurality of processors; accessing coherency information associated with the demanded cache line from a memory unit by bringing in from a memory page in which the demanded cache line is stored, the memory page also including a directory line having coherency information corresponding to the demanded cache line; reading data associated with the demanded cache line in accordance with the coherency information; and returning the data to the processor.

23 Claims, 6 Drawing Sheets

IN-MEMORY, IN-PAGE DIRECTORY CACHE COHERENCY SCHEME

FIELD

Embodiments of this invention relate to an in-memory, in-page directory cache coherency scheme.

BACKGROUND

The use of multiple processors or processors with multiple cores has become increasingly common as a method of increasing the computing power of new computer systems. Multiprocessor and multicore systems share system resources such as system memory and storage devices. Multiple processors or cores often access the same data in memory or storage devices and attempt to utilize this data at the same time. To accomplish this, multiprocessor and multicore systems manage the use of data to maintain data coherency. One facet of maintaining data coherency in multiprocessor systems is ensuring that data cached in each processor is coherent. For example, each processor may obtain the ownership of a cache line in its cache before writing it back to system memory. If another processor requests to write this data to the system memory, it must obey the coherent protocol requirement to obtain the ownership of this cache line prior to its write back.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples are described in detail, or where one or more examples are provided, it should be understood that the examples are not to be construed as exhaustive, and are not to be limited to embodiments of the invention to the examples described and/or illustrated.

Figure 1:
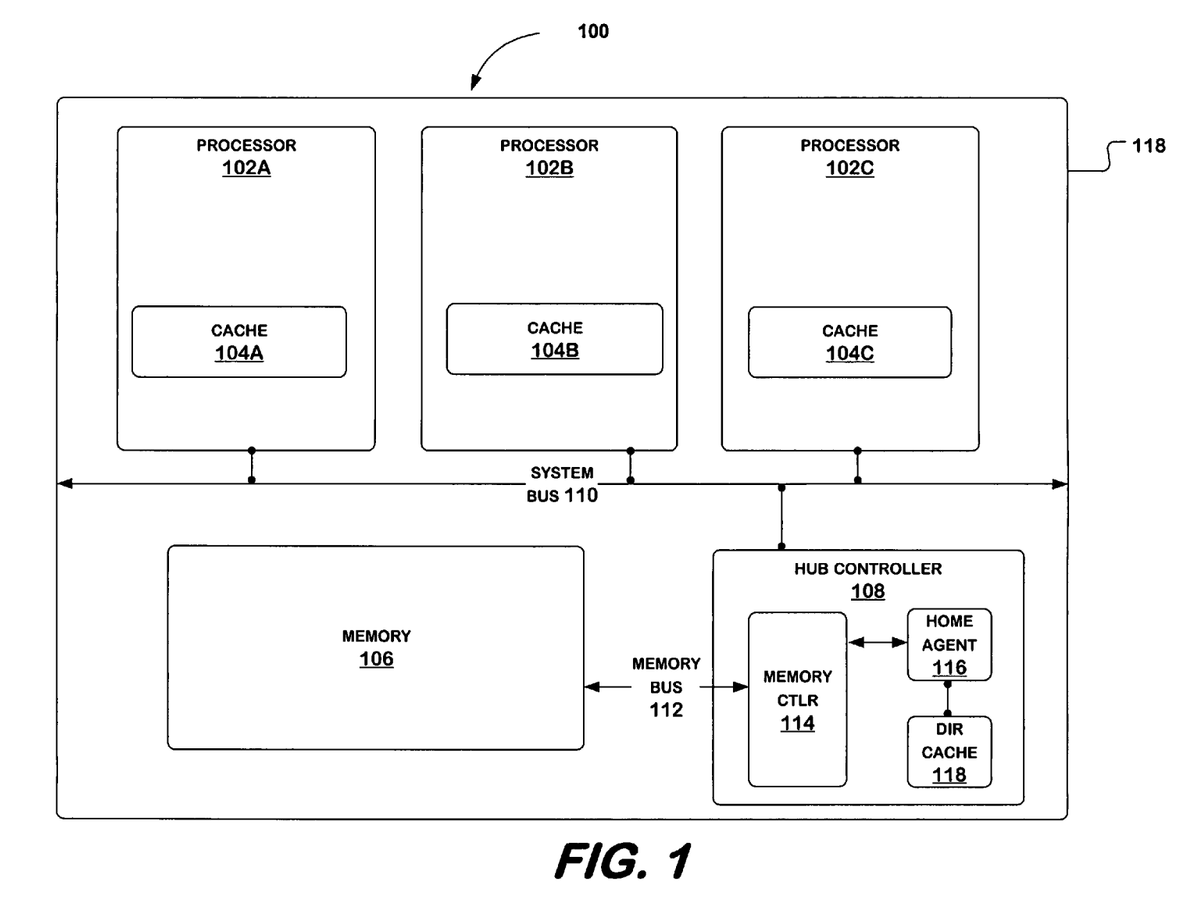
FIG. 1 illustrates a system in accordance with an embodiment of the invention.

FIG. 1 is a diagram of one embodiment of a system. The system 100 may be any type of multiprocessor or multicore system including a personal computer, mainframe computer, handheld computer, consumer electronic device (cellular phone, handheld gaming device, set-top box, or similar device), network device, automobile/avionic electronic controller or other similar devices.

The system 100 may have any number of processors 102A, 102B, 102C each having at least one cache 104A, 104B, 104C associated with the processor 102A, 102B, 102C. In one embodiment, the system 100 may have a scalable number of processors 102A, 102B, 102C, where the number of the processes can be varied due to the different system configurations for different market segments. In another embodiment, the system 100 may have slots or interfaces for any number of processors. The number of processors may be changed by adding or removing processors from the system.

In one embodiment, the processors 102A, 102B, 102C may be processors with separate cores and on separate substrates and in separate packages. In another embodiment, the processors 102A, 102B, 102C may contain multiple cores on a single substrate and chip package or combinations thereof. For sake of convenience in description, the example system described is a multiprocessor personal computer system. Each processor 102A, 102B, 102C may correspond to one or more caches 104A, 104B, 104C. For example, processors 102A, 102B, 102C may have a level 1 cache as well as a level 2 cache. The highest level cache may be referred to as a last level cache (LLC).

Each processor 102A, 102B, 102C may communicate with a hub controller 108 through a respective bus 110, 112. The hub controller 108 may be a device or chipset that includes a memory controller 114 to manage the movement of data between the processors 102A, 102B, 102C and system memory 106 as well as other devices (not shown) in the system 100. In one embodiment, a single hub controller 108 may be present in the system 100. In another embodiment, multiple hub controllers may be present or the hub controller 108 may be subdivided into multiple components. For example, some personal computer systems have two hub controllers referred to as a north bridge and a south bridge. Furthermore, as another example, systems with multiple sockets and multiple memory controllers may have separate hub controllers.

In the embodiment of FIG. 1, hub controller 108 may additionally comprise home agent 116 and directory cache 118, which may operate in conjunction with memory controller 114 for the management of data coherence between processors 102A, 102B, 102C. Home agent 116 may manage memory reads, writes, special reads and writes, memory consistency, and ordering, and may also manage system coherency protocol for memory accesses. Directory cache 118 may store entries corresponding to memory 106 addresses. In an embodiment, the size of directory cache 118 may be equal to the number of open pages in memory controller 114, to ensure that each page hit access in memory 106 also results in a directory cache 118 hit.

Figure 2:
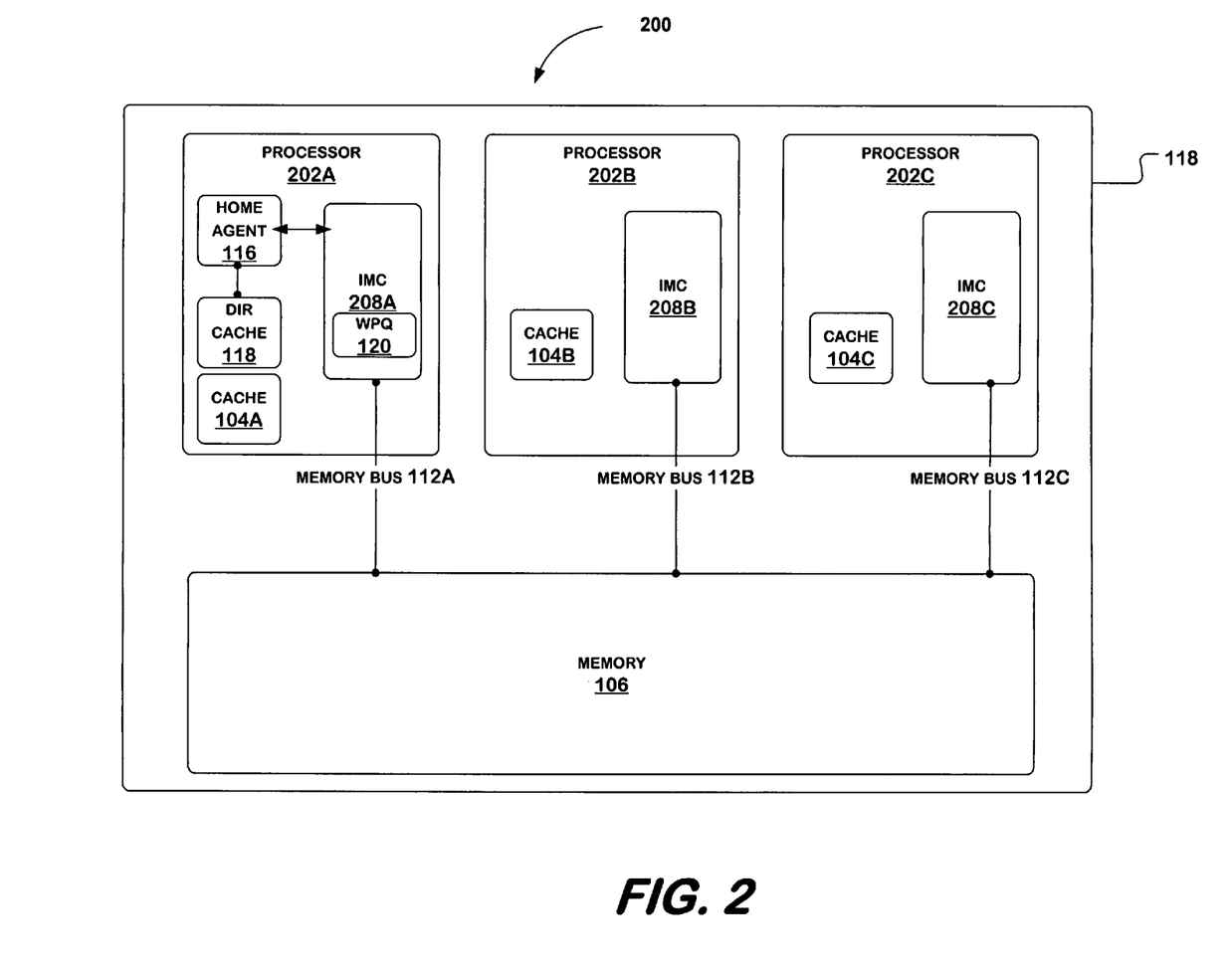
FIG. 2 illustrates a system in accordance with another embodiment of the invention.

In another embodiment, illustrated in system 200 of FIG. 2, home agent 116 and directory cache 118 may be located with integrated memory controller 208A, and on processor 202 die. In this embodiment, processors 202A, 202B, 202C may each also comprise integrated memory controller 208A, 208B, 208C. Integrated memory controllers 208A, 208B, 208C may access dedicated portion of memory 106 (dedicated portions not shown), each memory controller 208A, 208B, 20C using respective dedicated memory bus 112A, 112B, 112C.

System memory 106 may be any type of dynamic random access memory (DRAM) device or group of memory devices. For example system memory 105 may include synchronous DRAM, dual data rate DRAM, static random access memory (SRAM), and similar types of memory devices. Furthermore, system memory 105 may be packaged as a module, such as a SIMM (single in-line memory module), or a DIMM (dual in-line memory module), for example. System memory 106 may be used to store data and program instructions for use by the processors 102A, 102B, 102C. In an embodiment, system memory 106 may store data according to a predetermined grouping, so that data may be retrieved using that grouping. For example, data may be stored in memory 106 so that it may be retrieved a page at a time. In another embodiment, system memory 106 may be a static memory device, flash memory device or similar memory device such as an electronically erasable programmable read only memory (EEPROM), memory stick or similar device.

Figure 3:
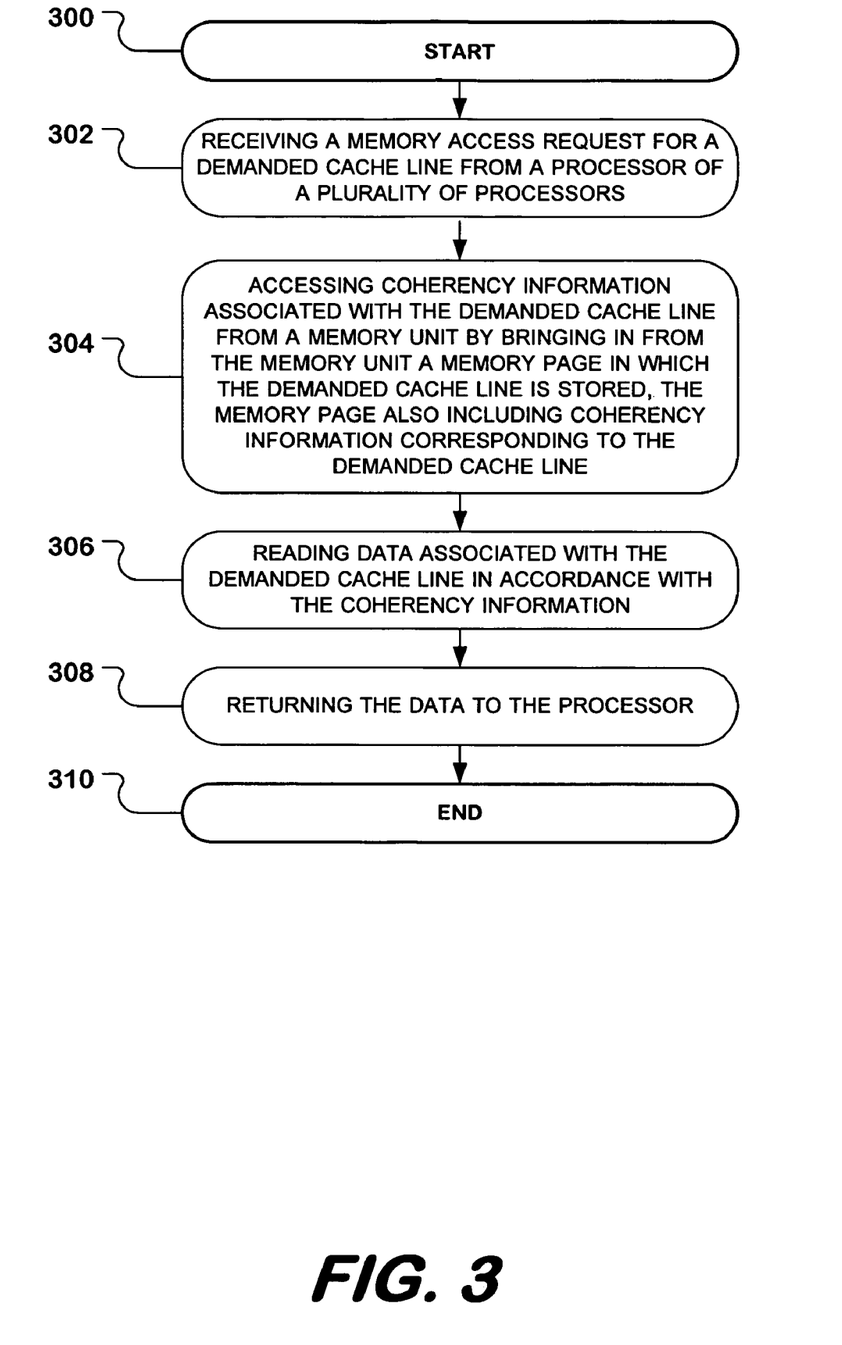
FIG. 3 illustrates a method according to an embodiment of the invention.

FIG. 3 illustrates a method in accordance with an embodiment of the invention. In an embodiment, block 302 of FIG. 3 may be performed by home agent 116, and remaining blocks of FIG. 3 may be performed by memory controller 114, 208A.

The method begins at block 300 and continues to block 302 where the method may comprise receiving a memory access request for a demanded cache line from a processor of a plurality of processors. In an embodiment, as illustrated in FIG. 2, memory controller 208A, 208B, 208C may be integrated on die with processor 202A, 202B, 202C, and each processor 202A, 202B, 202C may include cache 104A, 104B, 104C.

In this embodiment, if the memory access request to memory controller 208A is from one of other processors 202B, 202C, memory access request is said to be remote. In this case, a snoop of local cache 104A may be issued since directory cache 118 does not track local cache 104A. For example, home agent 116 may issue a snoop to local cache 104A in parallel with request to memory 106. If home agent 116 later determines that the snoop was not necessary, it may wait for the snoop response to come back, and then complete the memory read.

Likewise, if memory access request to memory controller 208A is from processor 202A, the memory access request is said to be local. In this case, snoop on local cache 208A is performed prior to memory access request being sent to memory controller 208A.

At block 304, the method may comprise accessing coherency information associated with the demanded cache line from a memory unit by bringing it in from a memory page in which the demanded cache line is stored, the memory page also including a directory line having coherency information corresponding to the demanded cache line. As used herein, "bringing in" may comprise accessing a page of memory from a memory unit, such as system memory 106, using a row address, and reading the memory page into directory cache 118. In embodiments of the invention, "memory page" may include a directory cache line having coherency information corresponding to at least one cache line, including the demanded cache line. Specifically, for example, a portion of memory page may include a directory cache line that holds coherence information the demanded cache line as well as other cache lines stored in that memory page.

Figure 4:
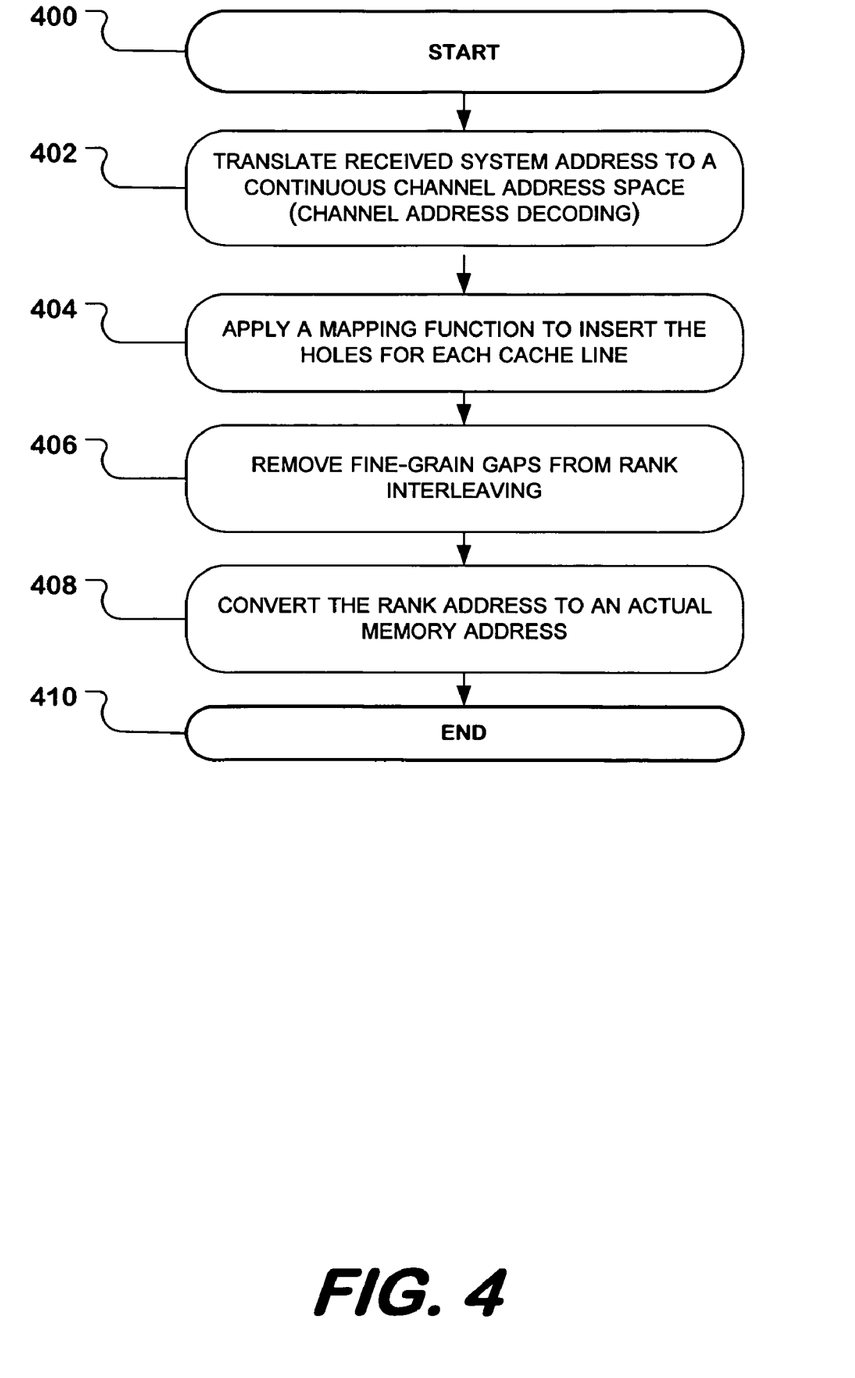
FIG. 4 illustrates a method according to an embodiment of the invention.

FIG. 4 illustrates a method to store coherency information in a directory cache line in a memory page. The method begins at block 400, and continues to block 402 where the method may comprise translating the received system address to a continuous channel address space (channel address decoding). Using the received system address, the region, home, and way-interleave are decoded, and then recalculated. In an embodiment, this may be implemented by first removing socket interleave bits, and then removing the channel interleave bits (or performing a div3 in the case of 3 channel systems). The base region address is subtracted off, and the fine-grain gaps from the way-interleave are removed to get a continuous address space for each channel (e.g., using subtraction and shift).

Figure 5:
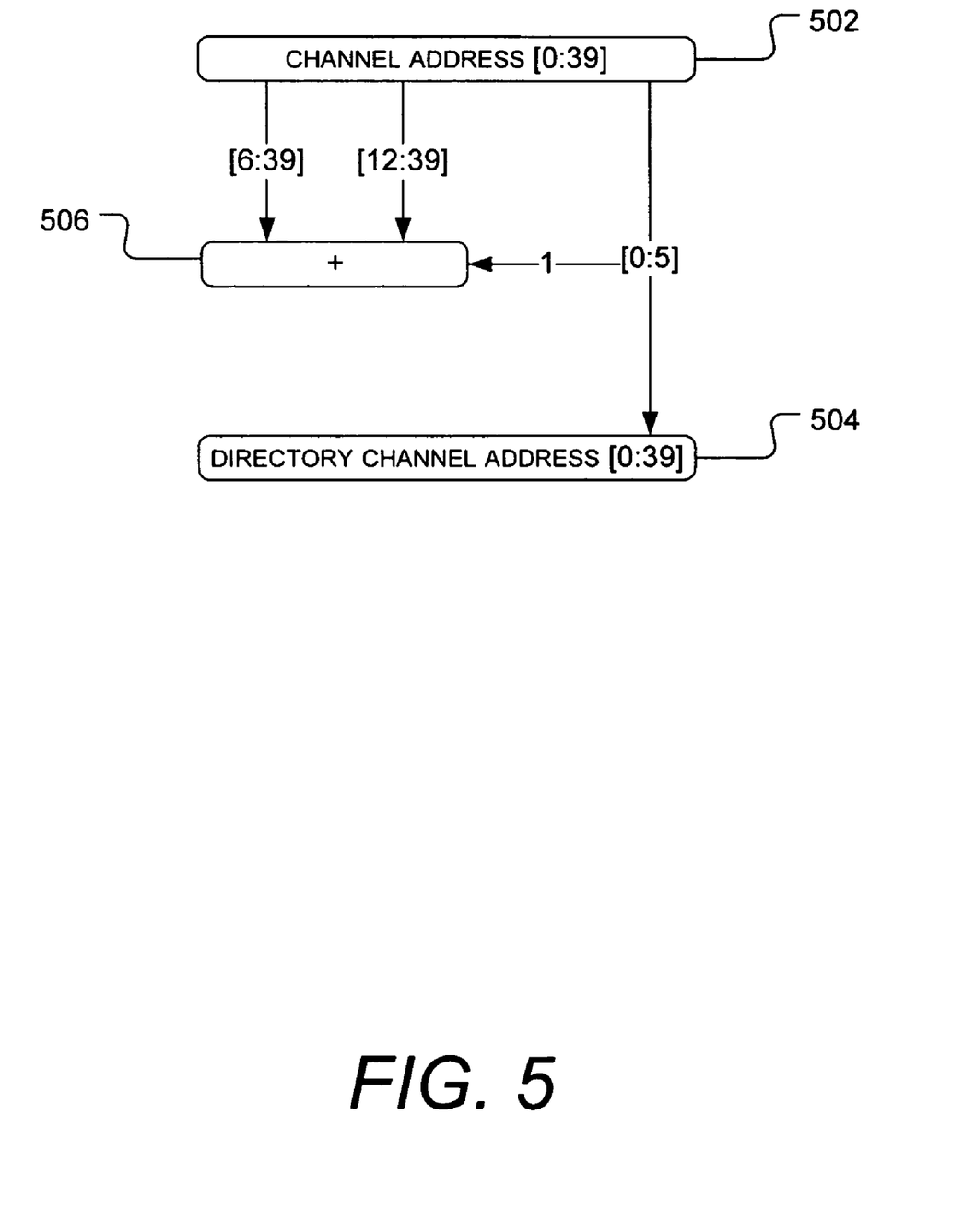
FIG. 5 illustrates an apparatus to insert cache-line holes in accordance with an embodiment of the invention.

At block 404, the method may comprise applying a mapping function to insert the holes for each directory cache line. For example, as illustrated in FIG. 5, the following function may be used to insert the cache-line holes:

$A_{new}$ 504=$A_{old}$ 502+(($A_{old}$>>6) & mask-lower-x-bits), where $A_{new}$=remapped channel address, and $A_{old}$=decoded channel address input to the mapping-function.

Put differently:

$A_{new}[n-1:0]=A_{old}[n-1:0]$;
$A_{new}[63:n]=A_{old}[63:n]+A_{old}[63:n]>>n$
Where n=ln(cache line size).

The effect of this mapping function is that the remapped addresses are drifted in the physical page they map to and there is space created for the directory lines in between physical address range. This operation can be implemented with a single adder 506—the shift and mask do not require any additional hardware. In an embodiment, the size of the shift is fixed, but may be adapted for different address decoding techniques.

At block 406, the method may comprise removing fine-grain gaps from rank interleaving.

At block 408, the method may comprise converting the rank address to an actual memory address. In DRAM, for example, the rank address may be converted to an actual DIMM, rank, bank, row, and column. The row may be used to access the directory cache, and the column may be used to issue a read request.

The method of FIG. 4 may end at block 410.

For example, the directory information may be stored throughout the memory (e.g., DRAM) address space. In this example, 64B chunks of directory data are stored in the DRAM at DRAM addresses when column bits [4:8] are 0. Column bits [3:0] may be used to select the chunk within the 64 B line. This effectively steals 64 B from the DRAM space from every 4 KB of DRAM space. The algorithm can be easily adapted to change the size and frequency of the directory lines. For example, one could adapt the algorithm such that 64 B were stolen from each 8 KB of dram space and have the directory lines when columns bits [4:9] were 0.

In an embodiment, some number of column address bits may be contiguous. In this example, holes are inserted every 4 KB (12 address bits in a byte-addressable system). The cache lines are 64 B (6 address bits), so there may be 6 contiguous column address bits for the mapping function to work. It is acceptable for the socket or channel interleave bits to break up the system address space in between these 6 column bits.

In order to account for the tiny holes that are inserted throughout the memory address space, large blocks of system address may be reclaimed at the top of each SAD/TAD region (System Address decoder, Target Address Decoder). The system address decoder provides the requirements and rules of the system memory configuration. The target address decoder provides the requirements and rules of the DRAM connecting to its home agent within a socket. This prevents addresses from drifting from one region into another, which is illegal because the translation process happens after the SAD/TAD are decoded. These large holes in the physical address space are reclaimed by the BIOS and communicated to the operating system through pre-existing infrastructure so that the operating system does not map virtual addresses to these physical addresses.

Since the memory address decoder doesn't generate the directory line addresses, accessing the directory lines for testing/visibility may be difficult. Consequently, an indicator (e.g., 1-bit) may be used to enable home agent 116 to read the directory line corresponding to the input address given from home agent 116, and that returns it as data. This makes the 6 lower-order column-bits of address '0' before the memory address decoder performs decoding.

Furthermore, accessing coherency information may comprise allocating the coherency information at the directory cache 118. Allocating the coherency information at the directory cache 118 may comprise bringing the directory line into the directory cache 118 so that coherency information for cache lines in the memory page is available a the directory cache 118. Allocating the coherency information may be skipped with a page close policy for reduction of the overhead. Alternatively, the directory cache may be expanded beyond the page table, so that many cache lines may be stored at a time, and in this case, coherency information may be allocated.

At block 306, the method may comprise reading data associated with the demanded cache line in accordance with the coherency information. Data may be read from any of caches 104A, 104B, 104C, or directly from memory 106. As used herein, "coherency information" relates to information regarding the coherency status of a cache line. A coherency status may depend on a particular coherency protocol being used. For example, in the MESI (modified, exclusive, shared, invalid) protocol, the coherency information may comprise "exclusive to the processor", "shared", "invalid", or "modified".

If coherency information indicates that no other processor 202A, 202B, 202C has the demanded cache line, then the data may be read directly from memory 106 without need to snoop the remote caches.

If the coherency information indicates one or more other processors 202A, 202B, 202C may have the demanded cache line, then snoops may be issued to the processor sockets to check for the demanded cache line. If one of the caches 104A, 10B, 10C owns the demanded cache line, the data may be read from that processor. Such processor may be referred to as an "owner processor".

At block 308, the method may comprise returning the data to the requesting processor.

The method may end at block 310.

Figure 6:
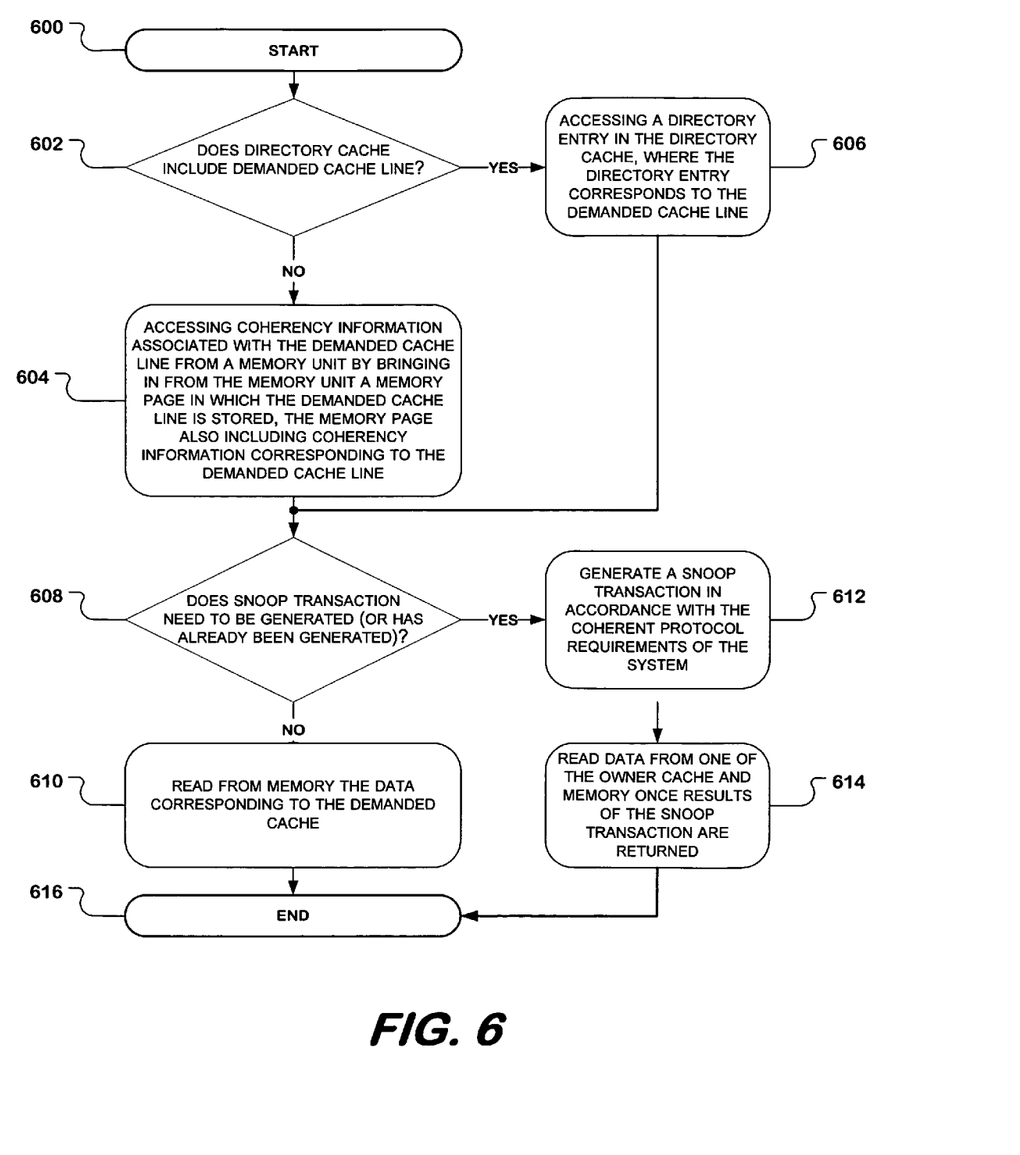
FIG. 6 illustrates a method according to another embodiment of the invention.

In an embodiment, the method above may be performed in conjunction with using a directory cache 118. A method in accordance with this embodiment is illustrated in FIG. 6, which begins at block 600. It continues to block 602 where it may first be determined if directory cache 118 includes cache entry corresponding to the demanded cache line. Cache entry corresponding to demanded cache line may comprise coherency information related to the demanded cache line. If directory cache 118 does not include cache entry corresponding to the demanded cache line, then the method continues to block 604. If directory cache 118 includes cache entry corresponding to the demanded cache line, then the method may continue to block 606.

At block 604, the method may comprise accessing coherency information associated with the demanded cache line from a memory unit by bringing it in from a memory page in which the demanded cache line is stored, the memory page also including a directory line having coherency information corresponding to the demanded cache line.

Furthermore, in some embodiments, a speculative snoop may be dispatched to other processor 202A, 202B, 202C, substantially concurrently with accessing the coherency information. As used herein, "substantially concurrently" refers to occurring at or about the same time as. In particular, a speculative snoop may be dispatched substantially concurrently with allocating the coherency information at the directory cache 118. Since it is unknown whether and which of the processor 202A, 202B, 202C may have the demanded cache line (at their respective caches 104A, 104B, 104C), a snoop may be speculatively sent to the processor 202A, 202B, 202C to determine if any of the processor 202A, 202B, 202C has the demanded cache line.

For example, if directory cache 118 indicates that one or more of processor 202A, 202B, 202C may have the demanded cache line, home agent 116 may wait for results of the speculative snoop prior to returning the data. In contrast, if the directory cache 118 indicates that none of processors 202A, 202B, 202C has the demanded cache line, then the demanded cache line may be returned directly from memory 106. Furthermore, if a speculative snoop was sent, there is no need to wait for the speculative snoop results prior to returning the demanded cache line directly from memory 106. Consequently, reading the data associated with the demanded cache line may be based, at least in part, on results of the speculative snoop.

Since pulling the cache line in to the directory cache 118 may take some time in certain embodiments, the snoop transaction may be speculatively dispatched to capitalize on use of the time slot. However, generating a speculative snoop may also depend on the inter-socket linker traffic and utilization. If the utilization of the inter socket linkers is high, the speculative snoop may not be dispatched prior to allocating the coherency information at the directory cache 118.

At block 606, the method may comprise accessing a directory entry in the directory cache, where the directory entry includes an entry for the demanded cache line.

At block 608, the method may comprise determining if a snoop transaction needs to be generated (or if one has already been generated). For example, a snoop transaction may need to be generated if the coherency information in the directory entry indicates that any of processors 202A, 202B, 202C may have a copy of the line or if the memory access request indicates the need for exclusive ownership. If a snoop transaction does not need to be generated, the method continues to block 610. If a snoop transaction needs to be generated (or one has already been generated), the method continues to block 612.

At block 610, if a snoop transaction does not need to be generated, the data corresponding to the demanded cache line may be read directly from memory.

At block 612, if a snoop transaction needs to be generated, then home agent 116 may generate a snoop transaction in accordance with the coherent protocol requirements of the system (if one was not already generated). If a snoop transaction was previously generated, the method may continue to block 614.

At block 614, data may be read from one of the owner cache and memory once results of the snoop transaction are returned. If the snoop transaction indicates that none of caches owns the demanded cache line, data may be directly supplied from memory; otherwise, it may be supplied by the owning cache.

In an embodiment, home agent 116 may send a data-send-complete indicator to indicate that the snoops have completed so that identifiers and other variables may be de-allocated. Also, if speculative snoops are sent and not needed, so that the data is read and sent before the speculative snoops are returned, home agent 116 may send a data send indicator separately from a complete indicator. Furthermore, if the memory access request is a remote request, home agent 116 may wait for the local snoop to complete prior to issuing a data-send-complete indicator or a complete indicator.

The method may end at block 616.

Upon a page-close (pre-charge) command being issued to memory 106, an eviction hint may be sent to directory cache 118. This policy allows correlation between a page-hit for data in memory 106 to be associated with a directory cache 118 hit, while still maintaining a smaller-sized directory cache 118. Upon receiving a page close command, directory cache 118 may issue a posted write to memory controller 114, 208A if a directory line has been modified. The directory line may lie in a write post queue (WPQ) of memory controller 114, 208A until it is flushed. In this way, WPQ acts as a victim buffer for directory cache 118, and also puts added pressure on WPQ to increase the frequency of write major mode. The size of the WPQ may need to be increased as a result. Dirty directory cache 118 data may also be written back prior to page close, decreasing the likelihood of requiring an additional page open to write the directory data back.

Further optimizations may be achieved. For example, the directory cache can also use the MESI state information of the copy of a particular cache line in another processor to fine the optimal (minimum traffic and latency) coherent implementation to achieve the best performance. For example, read access does not need to have exclusive state, as modified data is already in exclusive state and can be directly forward to the requester.

Embodiments of the invention scale well to an increase in the number of processors or processor cores. For example, when a system adds more processors, the home agent and attached memory may enable directory information in the memory scaled up correspondingly.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method comprising:
  receiving a memory access request for a demanded cache line from a processor of a plurality of processors;
  accessing coherency information associated with the demanded cache line from a memory unit by bringing in from a memory page in which the demanded cache line is stored, the memory page also including a directory line having coherency information corresponding to the demanded cache line;
  reading data associated with the demanded cache line in accordance with the coherency information; and
  returning the data to the processor,
  wherein an eviction hint is to be sent to a directory cache in response to a page close command and wherein the directory cache is to issue a posted write to a memory controller, coupled to the memory unit, if a line within the directory cache has been modified.

2. The method of claim 1, wherein the coherency information indicates no other processor of the plurality of processors has the demanded cache line, and said reading data associated with the demanded cache line comprises reading the data from the memory page.

3. The method of claim 1, wherein the coherency information indicates one or more other processors of the plurality of processors may have the demanded cache line, and said reading data associated with the demanded cache line comprises reading the data from one of an owner cache and from the memory page.

4. The method of claim 1, additionally comprising determining that the directory cache does not include an entry corresponding to the demanded cache line prior to accessing coherency information associated with the demanded cache line from the memory unit.

5. The method of claim 4, additionally comprising dispatching a speculative snoop to other processors of the plurality of processors, said dispatching performed substantially concurrently with said accessing coherency information.

6. The method of claim 5, wherein said reading data associated with the demanded cache line is based, at least in part, on results of the speculative snoop.

7. The method of claim 4, additionally comprising:
  if the directory cache includes an entry corresponding to the demanded cache line, accessing the entry in the directory cache, the entry including coherency information associated with the demanded cache line; and
  if the coherency information indicates that a snoop transaction is needed, generating a snoop transaction to the owner processor.

8. The method of claim 7, wherein said accessing coherency information associated with the demanded cache line from a memory unit by bringing in from the memory unit a memory page in which the demanded cache line is stored, additionally comprises allocating the coherency information at the directory cache.

9. An apparatus comprising:
  a home agent to receive a memory access request for a demanded cache line from a processor of a plurality of processors; and
  a memory controller to:
    access coherency information associated with the demanded cache line from a memory unit by bringing in from a memory page in which the demanded cache line is stored, the memory page also including a directory line having coherency information corresponding to the demanded cache line;
    read data associated with the demanded cache line in accordance with the coherency information; and
    return the data to the processor,
    wherein an eviction hint is to be sent to a directory cache in response to a page close command and wherein the directory cache is to issue a posted write to the memory controller if a line within the directory cache has been modified.

10. The apparatus of claim 9, wherein the coherency information indicates no other processor of the plurality of processors has the demanded cache line, and said memory controller to read data associated with the demanded cache line comprises said memory controller to read the data from the memory page.

11. The apparatus of claim 9, wherein the coherency information indicates one or more other processors of the plurality of processors may have the demanded cache line, and said memory controller to read data associated with the demanded cache line comprises said memory controller to read the data from one of an owner cache and from the memory page.

12. The apparatus of claim 9, the memory controller to additionally determine that the directory cache does not include an entry corresponding to the demanded cache line prior to the memory controller accessing coherency information associated with the demanded cache line from the memory unit.

13. The apparatus of claim 12, the memory controller to additionally dispatch a speculative snoop to other processors of the plurality of processors, the memory controller to perform the dispatching substantially concurrently with the memory controller accessing coherency information.

14. The apparatus of claim 12, the memory controller to additionally:
- access the entry in the directory cache, the entry including coherency information associated with the demanded cache line, if the directory cache includes an entry corresponding to the demanded cache line; and
- to generate a snoop transaction to the owner processor if the coherency information indicates that a snoop transaction is needed.

15. The apparatus of claim 14, wherein the memory controller additionally allocates the coherency information at the directory cache when accessing coherency information associated with the demanded cache line from a memory unit by bringing in from the memory unit a memory page in which the demanded cache line is stored.

16. The apparatus of claim 9, wherein the apparatus is comprised on a processor die.

17. A system comprising:
- a memory unit;
- a memory bus coupled to the memory unit; and
- a hub controller coupled to the memory bus, the hub controller having:
  - a home agent to receive a memory access request for a demanded cache line from a processor of a plurality of processors; and
  - a memory controller to:
    - access coherency information associated with the demanded cache line from the memory unit by bringing in from a memory page in which the demanded cache line is stored, the memory page also including a directory line having coherency information corresponding to the demanded cache line;
    - read data associated with the demanded cache line in accordance with the coherency information; and
    - return the data to the processor,
    - wherein an eviction hint is to be sent to a directory cache in response to a page close command and wherein the directory cache is to issue a posted write to the memory controller if a line within the directory cache has been modified.

18. The system of claim 17, wherein the coherency information indicates no other processor of the plurality of processors has the demanded cache line, and said memory controller to read data associated with the demanded cache line comprises said memory controller to read the data from the memory page.

19. The system of claim 17, wherein the coherency information indicates one or more other processors of the plurality of processors may have the demanded cache line, and said memory controller to read data associated with the demanded cache line comprises said memory controller to read the data from one of an owner cache and from the memory page.

20. The system of claim 17, the memory controller to additionally determine that the directory cache does not include an entry corresponding to the demanded cache line prior to the memory controller accessing coherency information associated with the demanded cache line from the memory unit.

21. The system of claim 20, the memory controller to additionally dispatch a speculative snoop to other processors of the plurality of processors, the memory controller to perform the dispatching substantially concurrently with the memory controller accessing coherency information.

22. The system of claim 20, the memory controller to additionally:
- access the entry in the directory cache, the entry including coherency information associated with the demanded cache line, if the directory cache includes an entry corresponding to the demanded cache line; and
- to generate a snoop transaction to the owner processor if the coherency information indicates that a snoop transaction is needed.

23. The system of claim 22, wherein the memory controller additionally allocates the coherency information at the directory cache when accessing coherency information associated with the demanded cache line from a memory unit by bringing in from the memory unit a memory page in which the demanded cache line is stored.

* * * * *